(12) United States Patent
Cadigan et al.

(10) Patent No.: US 9,003,068 B2
(45) Date of Patent: Apr. 7, 2015

(54) SERVICE CHANNEL FOR CONNECTING A HOST COMPUTER TO PERIPHERAL DEVICES

(75) Inventors: David D. Cadigan, Poughkeepsie, NY (US); Thomas J. Griffin, Salt Point, NY (US); M. Dean Sciacca, Poughkeepsie, NY (US); Dustin J. VanStee, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 13/547,369

(22) Filed: Jul. 12, 2012

(65) Prior Publication Data
US 2014/0019646 A1    Jan. 16, 2014

(51) Int. Cl.
G06F 3/00     (2006.01)
G06F 1/18     (2006.01)

(52) U.S. Cl.
CPC ...................... *G06F 1/185* (2013.01)

(58) Field of Classification Search
CPC .................................................. G06F 12/0246
See application file for complete search history.

(56) References Cited

U.S. PATENT DOCUMENTS

| | | | |
|---|---|---|---|
| 7,506,098 B2 | 3/2009 | Arcedera et al. | |
| 8,069,302 B2 | 11/2011 | Lasser et al. | |
| 8,069,318 B2 | 11/2011 | Karabatsos | |
| 8,069,328 B2 | 11/2011 | Pyeon | |
| 8,099,624 B1 * | 1/2012 | Saxena et al. | 714/5.11 |
| 2006/0037072 A1 * | 2/2006 | Rao et al. | 726/14 |
| 2009/0172499 A1 | 7/2009 | Olbrich et al. | |
| 2010/0082893 A1 | 4/2010 | Ma et al. | |
| 2011/0035548 A1 | 2/2011 | Kimmel et al. | |
| 2011/0099419 A1 | 4/2011 | Lucas et al. | |
| 2011/0153959 A1 | 6/2011 | Chu et al. | |
| 2011/0302477 A1 | 12/2011 | Goss et al. | |

* cited by examiner

*Primary Examiner* — Henry Tsai
*Assistant Examiner* — Juanito Borromeo
(74) *Attorney, Agent, or Firm* — Cantor Colburn LLP; Margaret McNamara

(57) ABSTRACT

A computer system having a host adapter is provided. The host adapter includes a primary port that follows a primary communication protocol. The primary port is connectable to at least one peripheral device. The host adapter includes a service port that follows a service communication protocol to monitor and send recovery commands to the peripheral device. The service port is decoupled and separate from the primary port and connectable to the at least one peripheral device.

20 Claims, 3 Drawing Sheets

SERVICE CHANNEL FOR CONNECTING A HOST COMPUTER TO PERIPHERAL DEVICES

BACKGROUND

The present invention generally relates to a host computer and peripheral devices, and more specifically, to connecting a host computer to peripheral devices by a service channel.

A solid-state disk or drive (SSD) is one type of flash memory device. A disk array is a disk storage system that contains multiple drives (e.g., multiple SSDs). A host adapter connects a host computer to the multiple drives in the disk array. For example, the host adapter may include multiple channels that allows for the various drives to communicate with the host adapter. Serial attached small computer system interface (SAS) and serial advanced technology attachment (SATA) are computer bus technologies for transferring data between devices (e.g., between the host computer and the various drives).

In the event a drive locks up or goes offline during system use, there are limitations to either collecting the status of the drive, or attempting drive recovery. Specifically, if the drive is unresponsive to a SAS or SATA based channel command, there is no approach for collecting the drive status or to attempt drive recovery. If, on the other hand, the drive is responsive to SAS or SATA based channel commands, then it is possible to collect the drive status and attempt drive recovery. However, collection of the drive status and the drive recovery also consumes some of the channel bandwidth, thus increasing response times.

SUMMARY

According to one embodiment, a computer system having a host adapter is provided. The host adapter includes a port that follows a communication protocol. The primary port is connectable to at least one peripheral device. The host adapter includes a service port that follows a service communication protocol. The service port is decoupled from the primary port and connectable to the at least one peripheral device.

In another embodiment, a method of monitoring a peripheral device is provided. The method includes providing a host adapter having a port and a service port. The primary port follows a communication protocol. The service port is decoupled from the primary port and following a service communication protocol. The method includes establishing communication from the primary port of the host adapter to a channel port of the peripheral device. The method includes sending a service port access request to a service port of the peripheral device by the service port of the host adapter.

DETAILED DESCRIPTION

In the event a drive locks up or goes offline, collection of the drive status and the drive recovery may consume some of the channel bandwidth, thus increasing response times. Exemplary embodiments described herein disclose a host adapter having a service port that is decoupled from a main channel port. The main channel port of the host device is connected to at least one peripheral device (e.g., a solid-state disk or drive (SSD)) by a communication channel. The service port of the host device is connected to an existing service port of a peripheral device by a service channel. The host adapter may monitor and send recovery commands to the peripheral device through the service channel. Thus, because status requests and recovery commands are sent through the service channel, the bandwidth of the communication channel remains unaffected. Moreover, the service port of the host device is connectable to an existing service port of the peripheral device. Therefore, there is no need to change industry-standard peripheral devices that are currently available in order to connect with the host adapter as disclosed.

Figure 1:
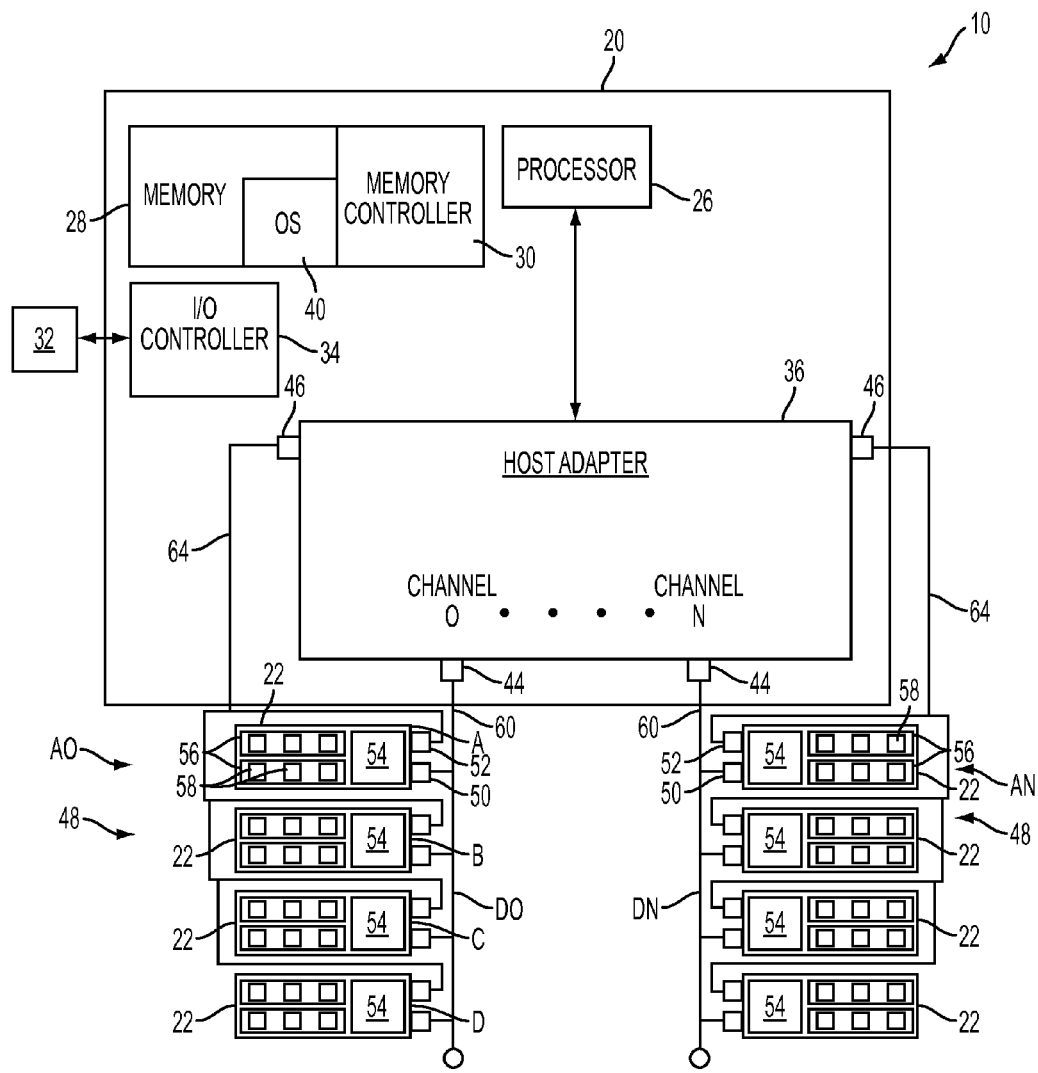
FIG. 1 is an exemplary illustration of a computer system connecting a host computer to a plurality of peripheral devices.

Turning now to FIG. 1, a block diagram illustrates an exemplary computing system 10 in accordance with the present disclosure. The computing system 10 is shown to include a computer 20 and a plurality of peripheral devices 22. As can be appreciated, the computing system 10 can include any computing device, including but not limited to, a desktop computer, a laptop, a server, a portable handheld device, or any other electronic device. For ease of the discussion, the disclosure will be discussed in the context of the computer 20.

The computer 20 is shown to include a processor 26, memory 28 coupled to a memory controller 30, one or more input and/or output (I/O) devices 32 (or peripherals) that are communicatively coupled via a local input/output controller 34, and one or more host adapters 36. In various embodiments, the memory 28 stores instructions that can be executed by the processor 26. The instructions stored in memory 28 may include one or more separate programs, each of which comprises an ordered listing of executable instructions for implementing logical functions. In the example of FIG. 1, the instructions stored in the memory 28 include a suitable operating system (OS) 40. The operating system 40 essentially controls the execution of other computer programs and provides scheduling, input-output control, file and data management, memory management, and communication control and related services.

When the computer 20 is in operation, the processor 26 is configured to execute the instructions stored within the memory 28, to communicate data to and from the memory 28, and to generally control operations of the computer 20 pursuant to the instructions. The processor 26 may be any custom made or commercially available processor, a central processing unit (CPU), an auxiliary processor among several processors associated with the computer 20, a semiconductor based microprocessor (in the form of a microchip or chip set), a macroprocessor, or generally any device for executing instructions.

The host adapter 36 connects a host system or computer (e.g., the processor 26 of the computer 20) to the peripheral devices 22. The host adapter 36 includes at least one channel port 44 and at least one debug or service port 46. The service port 46 is decoupled and separate from the channel ports 44. In the embodiment as shown in FIG. 1, the host adapter 36 includes channels 0-N (e.g., N+1 channels). Each channel port 44 is in communication with an array 48 of peripheral devices 22. In the exemplary embodiment as shown in FIG. 1, each array 48 includes four peripheral devices 22, however it is to be understood that the arrays 48 may include any number of peripheral devices 22 as well.

The peripheral devices 22 are in communication with the host adapter 36 by a channel port 50 and a service port 52. Each peripheral device 22 includes a device address that indicates a specific peripheral storage location. Specifically, for example, array A0 has four peripheral devices 22, where each peripheral device 22 has a unique device address associated therewith (e.g., peripheral device A has device address A, peripheral device B has device address B, peripheral device C has device address C, and peripheral device D has device address D).

Each peripheral device 22 also includes a controller 54. In the exemplary embodiment as shown in FIG. 1, the peripheral devices 22 are solid-state disk or drives (SSD). However, it is understood that the peripheral devices 22 may be other types of data storage devices such as, for example, a hard disk drive (HDD). Alternatively, in another embodiment, the peripheral device 22 may be a networking device such as, for example, a wireless network interface controller (WNIC), or a modem. FIG. 1 illustrates the peripheral devices 22 having a plurality of flash memory modules 56, where each flash memory module 56 includes a plurality of memory units 58. Although flash memory is illustrated, it is understood that the SSD devices may also be volatile (RAM-based) memory as well.

A communication channel 60 is provided for each of the channel ports 44 of the host adapter 36. The communication channel 60 connects one of the channel ports 44 of the host adapter 36 with one of the arrays 48 of peripheral devices 22 (e.g., a data connection D0 connects the channel 0 with an array A0, and a data connection DN connects the channel N with an array AN). Commands, status and data are communicated between the host adapter 36 and the peripheral devices 22 through the communication channel 60. The communication channel 60 may be, for example, a data transmission cable.

The host adapter 36 is in communication with the peripheral devices 22 through the communication channel 60. The peripheral devices 22 of each array 48 are also in communication with one another through the communications channel 60. The communication channel 60 follows a communication protocol for supporting status, data, and commands such as, for example, serial advanced technology attachment (SATA) protocol or serial attached SCSI (SAS) protocol. The channel port 44 of the host adapter 36 and the channel port 50 of each peripheral device 22 follow the communication protocol.

The service port 46 of the host adapter 36 is connected to the service port 52 of the peripheral devices 22 by a debug or service channel 64. The service port 46 of the host adapter 36 and the service port 52 of the peripheral devices 22 may follow any type of physical serial interface that allows the host adapter 36 to monitor and send recovery commands to the peripheral devices 22. In one exemplary embodiment, the service port 46 of the host adapter 36 and the service port 52 of the peripheral devices 22 may be test access ports following the joint action test group (JTAG) protocol, RS-232 protocol, I2C (Inter-Integrated Circuit) protocol, an abbreviated (i.e., a reduced pin set) JTAG protocol, the SAS protocol, or the SATA protocol. It should be noted that peripheral devices that are currently available usually have a physical serial interface (e.g., the service port 52) that follows the JTAG protocol, RS-232 protocol, I2C protocol, or a reduced pin set JTAG protocol.

In the embodiment as shown in FIG. 1, the service channel 64 is separated from the communication channel 60 (i.e., the service channel 64 is a separate cable or line from the communication channel 60). However, it is to be understood that in an alternative embodiment, the service channel 64 and the communication channel 60 may be bundled together, and separated or broken out at the channel port 50 and the service port 52. Also, in the embodiment as shown in FIG. 1, a single service port 46 and a single service channel 64 on the host adapter 36 are provided for each array 48 of peripheral devices 22. However, it is also understood that in an alternative embodiment, the host adapter 36 may include a single service port 46 and a single service channel 64, where the service channel 64 is to connected to each of the peripheral devices 22 of each array 48 (i.e., a daisy-chain configuration).

The service port 46 of the host adapter 36 obtains access to the registers of the controller 54 and the flash memory modules 56 (or RAM-based memory if applicable) of the peripheral devices 22 with a specific level of priority. Specifically, in one exemplary embodiment, the service port 46 obtains access to the peripheral devices 22 with one of three levels of priority, which are high, medium, and low. For example, a high level of priority would indicate that the service port 46 of the host adapter 36 is allowed access to the peripheral devices 22 after completion of the current operation over the communication channel 60. As another example, a medium level of priority would indicate that the service port 46 of the host adapter 36 is allowed access to the peripheral devices 22 once a peripheral device 22 is idle and has completed outstanding background operations. As another example, a low level of priority would indicate that the service port 46 of the host adapter 36 is allowed access to the peripheral devices 22 only after a peripheral device 22 has been placed into a special service mode. A handshaking protocol (for communicating command, status, and data) may be used to establish communication between the host adapter 36 and the peripheral devices 22 through the service channel 64.

Several approaches exist to determine the priority of access to the peripheral devices 22 from the host adapter 36. For example, in one embodiment, the controller 54 of each peripheral device 22 may include priority arbitration logic to instruct when the service port 46 may obtain access to the corresponding peripheral device 22. In another embodiment, priority may be determined by the serial communication within the service channel 64. Specifically, the packet traffic between the service port 46 of the host adapter 36 and the service port 52 of the peripheral devices 22 includes packet headers that indicate the priority of service access. In yet another embodiment, service access may be determined by using a combination of the controller 54 of each peripheral device 22 and the packet headers. Access to the host adapter 36 is allowed if a specific level of priority indicated by the host adapter 36 is greater than or equal to a priority level associated with the peripheral device 22. For example, if the host adapter 36 indicates a priority level of low, and the peripheral device 22 is associated with a priority level of medium, then the peripheral device 22 would deny access to the host adapter 36.

Once the service channel 64 obtains access to the peripheral devices 22, the host adapter 36 may access real-time data regarding the controller 54 and the flash memory modules 56 (or RAM-based memory if applicable). Specifically, for example, one approach for monitoring the health of the peripheral devices 22 may utilize a self-monitoring, analysis and reporting technology (SMART). SMART is a monitoring system configured for various types of disk drives to detect and report various indicators of reliability of a disk drive such as, for example, disk drive temperature (i.e. the temperature inside the disk drive housing), raw read error rate, retired block count, power-on hours (POH), or device power cycle count. Although the SMART approach is discussed, it is to be understood that any technology or logic that allows observation of the peripheral devices 22 and the status of the controllers 54 may be used as well.

For example, in one embodiment, the host adapter 36 may send a SMART request or query to the peripheral devices 22 though the service channel 64 to attempt to collect status information regarding the controller 54 and the flash memory modules 56. SMART data is sent from the service port 52 of the peripheral devices 22 back to the service port 46 of the host adapter 36. In the event one or more of the peripheral devices 22 are underperforming, locked, or indicate a pending failure, the service channel 64 may also be used to send a recovery command to the specific peripheral device 22. For example, if one or more of the peripheral devices 22 are locked, or in need of a re-boot, the host adapter 36 may send an unlock command or a re-boot command, respectively, through the service channel 64.

The host adapter 36 may also be able to send firmware updates, diagnostic commands, or re-configure each array 48 of peripheral devices 22 through the service channel 64. The host adapter 36 may change any configurable element of the peripheral devices 22 through the service channel 64. In one example, the computer 20 may direct the host adapters 36 to reconfigure all of the arrays 48 of peripheral devices 22 from a just a bunch of disks configuration (JBOD) to a redundant array of inexpensive disks (RAID) configuration, and vice-versa. In another example, the computer 20 may direct the host adapters 36 to reconfigure all of the arrays 48 of peripheral devices 22 for a specific RAID array type (e.g., RAID 0, RAID 1, RAID 5, RAID10 etc.). In both examples, the host adapters 36 may need to modify configurable elements within the peripheral devices 22 to support the new overall array structure.

Figure 2:
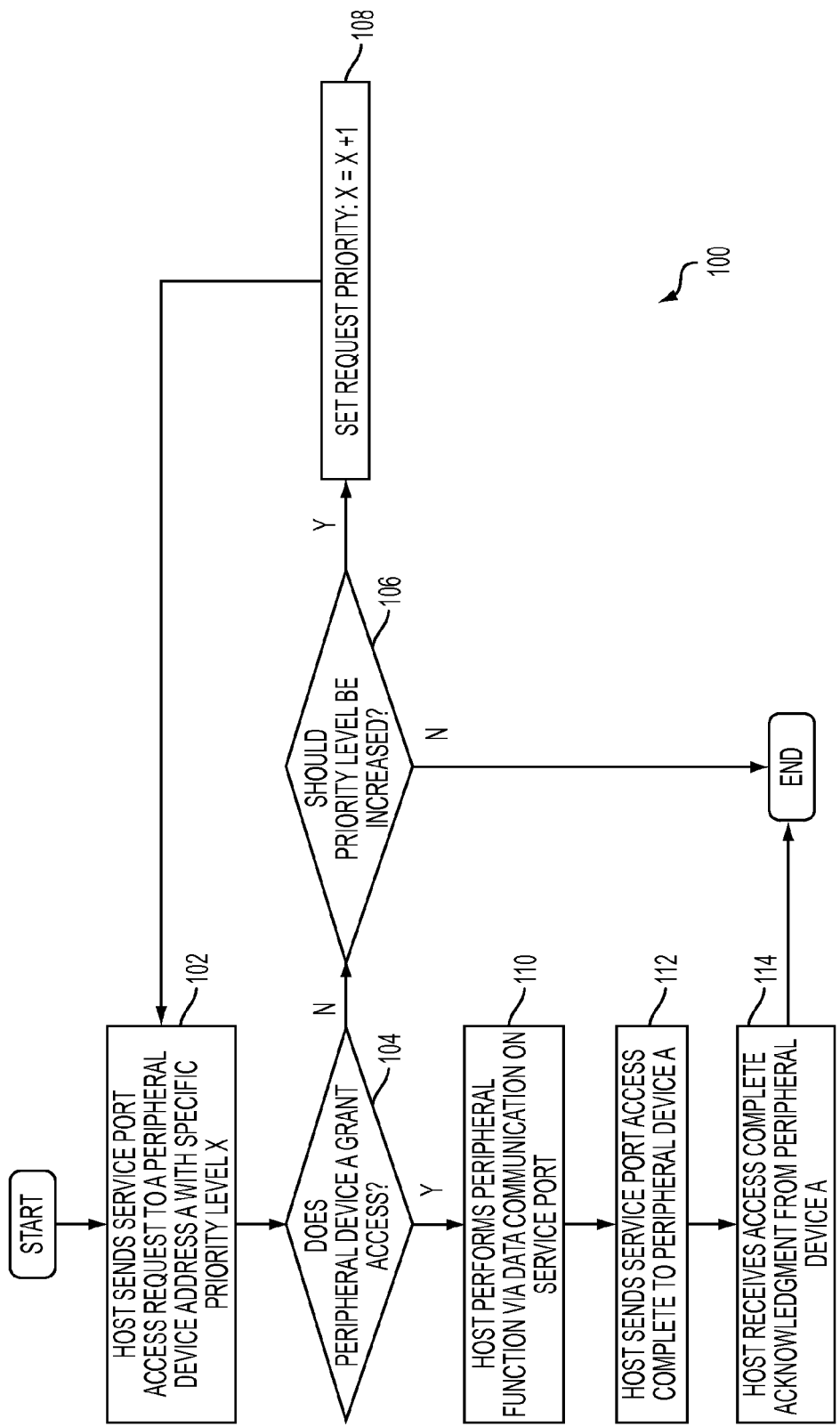
FIG. 2 is an exemplary flowchart illustrating a method of monitoring a specific peripheral device by the host computer shown in FIG. 1.

FIG. 2 is an exemplary flowchart illustrating a method of monitoring and performing corrective actions to at least one peripheral device 22 by a host system or computer (e.g., the computer 20), and is indicated by reference number 100. Referring to both FIGS. 1 and 2, method 100 begins at block 102, where the host adapter 36 sends a service port access request to a specific peripheral device 22 (e.g., the peripheral device 22 having the device address A) through the service channel 64. The service port access request includes a specific level of priority (which is referred to in block 102 as 'X'). For example, the specific level of priority X may be high, medium, or low. Method 100 may then proceed to block 104.

In block 104, the specific peripheral device A acknowledges the service port request, and either allows or denies access to the host adapter 36. Access to the host adapter 36 is allowed if the specific level of priority X indicated by the host adapter 36 is greater than or equal to a priority level of the specific peripheral device A (which is referred to as a peripheral priority level Y). For example, if the host adapter 36 indicates a priority level of low, and the peripheral priority level is medium, then the specific peripheral device A would deny access to the host adapter 36.

In the event access is denied, method 100 may then proceed to block 106, where the host adapter 36 determines if the specific level of priority X of should be bumped or increased. If the host adapter 36 determines no increase in the level of priority is needed, method 100 may terminate. If the host adapter 36 determined the level of priority should be increased, then method 100 may proceed to block 108, where the level of priority is incremented by one level (i.e., X=X+1, where X is the current level of priority). Specifically, for example, if the specific level of priority X was low, then the level of priority is incremented to medium. Method 100 may then proceed back to block 102.

In the event the specific peripheral device A allows access, method 100 may proceed to block 110. In block 110, the host adapter 36 performs peripheral functions via the service channel 64. Peripheral functions may include, for example, sending a SMART request or query to the peripheral devices 22 though the service channel 64 to attempt to collect status information regarding the controller 54 and the flash memory modules 56, recovery commands (e.g., a re-boot command), firmware updates, diagnostic commands, or a reconfiguration command. Method 100 may then proceed to block 112.

In block 112, the host adapter 36 sends a service port access complete signal to the peripheral device A through the service channel 60, once the peripheral functions have completed. Method 100 may then proceed to block 114.

In block 114, the host adapter 36 receives an access complete acknowledgment signal from the specific peripheral device A. The access complete signal may be generated by the controller 54 of the specific peripheral device 54. Once the host adapter 36 receives the access complete acknowledgment signal, method 100 may then terminate, or restart at block 102 with reference to another peripheral device 22 (e.g., the peripheral device 22 having the device address B).

Figure 3:
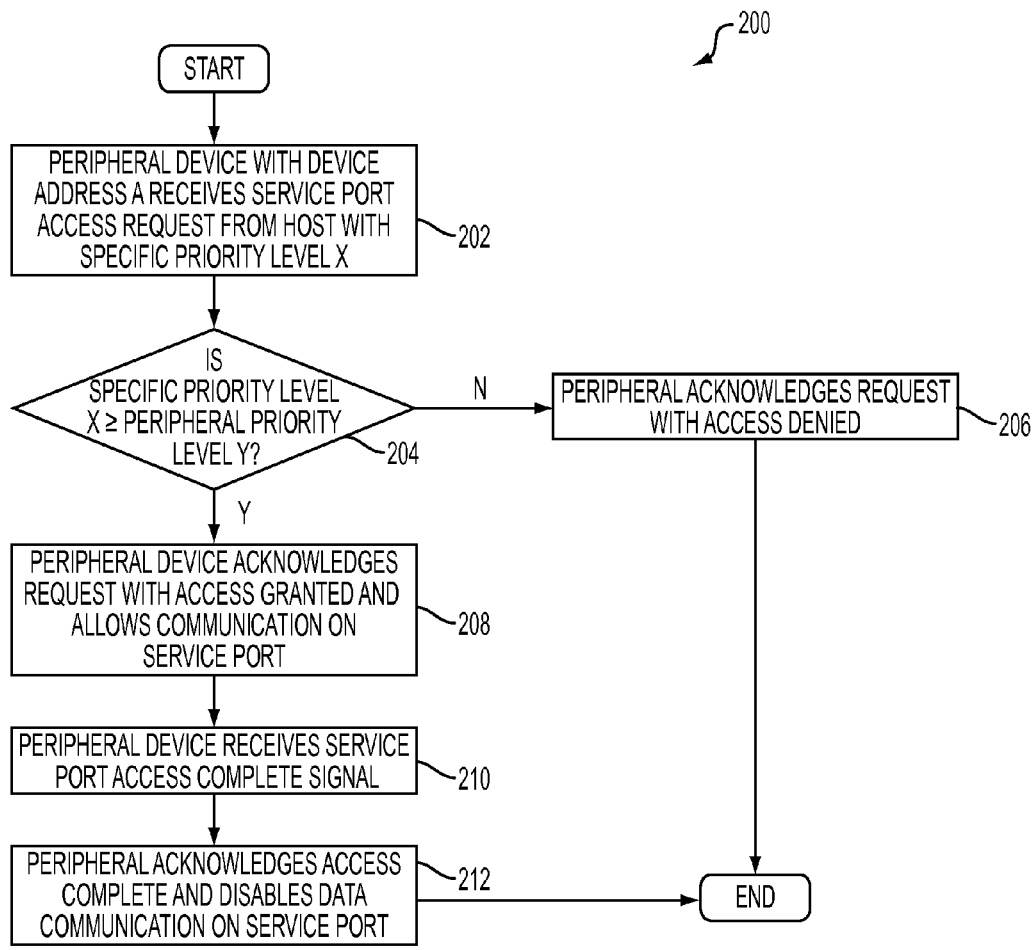
FIG. 3 is an exemplary flowchart illustrating a specific peripheral device being monitored by the host computer shown in FIG. 1.

FIG. 3 is an exemplary flowchart illustrating a method of obtaining access to the service port 52 of a specific peripheral device 22, and is indicated by reference number 200. Referring to both FIGS. 1 and 3, method 200 begins at block 202, where the specific peripheral device A receives a service port access request through the service channel 64 by the host adapter 36 with the specific level of priority (which is referred to in block 202 as 'X'). In one embodiment, the specific level of priority X may be high, medium, or low. Method 200 may then proceed to block 204.

In block 204, the specific level of priority (e.g., X) of the service port access request is compared with the peripheral priority level Y of the specific peripheral device A. If the specific level of priority X of the service port access request is not greater than or equal to the peripheral priority level Y, then method 200 may proceed to block 206. In block 206, the specific peripheral device A acknowledges the service port access request with an access denied signal generated by the controller 54. The access denied signal is sent though the service channel 64 back to the host adapter 36. Method 200 may then terminate.

If the level of priority X of the service port access request X is greater than or equal to the peripheral priority level Y, then method 200 may proceed to block 208. In block 208, the specific peripheral device A acknowledges the service port access request with an access granted signal generated by the controller 54. The access granted signal is sent though the service channel 64 back to the host adapter 36. The access granted signal allows for communication between the service port 46 of the host adapter 36 and the service port 52 of the specific peripheral device A. Method 200 may then proceed to block 210.

In block 210, the specific peripheral device A receives the service port access complete signal from the host adapter 36 through the service channel 60, which indicates the peripheral functions are complete. Method 200 may then proceed to block 212.

In block 212, the specific peripheral device A sends the access complete acknowledgment signal that is generated by the controller 54 to the host adapter 36 through the service channel 64. Once the specific peripheral device A sends the access complete acknowledgment signal, communication on the service port 52 of the specific peripheral device A is disabled. Method 200 may then terminate.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer system, comprising:
    a host adapter, including:
        a primary port that follows a primary communication protocol, the port connectable to at least one peripheral device; and
        a service port that follows a service communication protocol to monitor and send recovery commands to the at least one peripheral device, the service port being decoupled and separate from the primary port and connectable to the at least one peripheral device;
    wherein a controller of the at least one peripheral device includes priority arbitration logic to determine a priority of access between the host adapter and the controller, wherein a high level of the priority of access indicates that access to the least one peripheral device is allowed after completion of a current operation, a medium level of the priority of access indicates that access is allowed to the at least one peripheral device once the at least one peripheral device is idle and has completed outstanding background operations, and a low level of the priority of access indicates access is allowed only after the at least one peripheral device has been placed into a service mode.

2. The computer system of claim 1, wherein the at least one peripheral device includes a channel port and a service access port.

3. The computer system of claim 2, further comprising a communication channel, wherein the communication channel connects the channel port of the at least one peripheral device to the primary port of the host adapter.

4. The computer system of claim 2, further comprising a service channel, wherein the service channel connects the service access port of the at least one peripheral device to the service port of the host adapter.

5. The computer system of claim 4, wherein the host adapter monitors the at least one peripheral device through the service channel using a self-monitoring, analysis and reporting technology (SMART).

6. The computer system of claim 4, wherein the host adapter sends at least one of recovery commands, firmware updates, and diagnostic commands to the at least one peripheral device through the service channel.

7. The computer system of claim 2, wherein packet traffic between the service port of the host adapter and the service access port of the at least one peripheral device includes packet headers that indicate a priority of access between the host adapter and the controller.

8. The computer system of claim 2, wherein a controller of the at least one peripheral device and packet headers of packet traffic between the service port of the host adapter and the service access port of the at least one peripheral device indicate a priority of access between the host adapter and the controller.

9. The computer system of claim 1, wherein the host adapter includes a plurality of ports that are each connected to a separate array of peripheral devices.

10. The computer system of claim 9, wherein a service channel is provided for each separate array of peripheral devices.

11. The computer system of claim 1, wherein the service communication protocol is selected from the group consisting of: a joint action test group (JTAG) protocol, an RS-232 protocol, an I2C (Inter-Integrated Circuit) protocol, a reduced pin set JTAG protocol, a serial attached small computer system interface (SAS) protocol and a serial advanced technology attachment (SATA) protocol.

12. The computer system of claim 1, wherein the primary communication protocol is selected from a group consisting of a SAS protocol and a SATA protocol.

13. A method of monitoring a peripheral device, comprising:
    providing a host adapter having a primary port and a service port, the primary port following a primary communication protocol, and the service port decoupled and separate from the primary port and following a service communication protocol to monitor and send recovery commands to the peripheral device;
    establishing communication from the primary port of the host adapter to a channel port of the peripheral device; and
    sending a service port access request to a service access port of the peripheral device by the service port of the host adapter;
    wherein a controller of the peripheral device includes priority arbitration logic to determine a priority of access between the host adapter and the controller, wherein a high level of the priority of access indicates that access to the peripheral device is allowed after completion of a current operation, a medium level of the priority of access indicates that access is allowed to the peripheral device once the peripheral device is idle and has completed outstanding background operations, and a low level of the priority of access indicates access is allowed only after the peripheral device has been placed into a service mode.

14. The method of claim 13, comprising allowing the host adapter to obtain access to the peripheral device, wherein access is obtained by the peripheral device generating an access granted signal.

15. The method of claim 14, comprising performing at least one peripheral function by the host adapter, wherein a service channel connects the service access port of the peripheral device to the service port of the host adapter.

16. The method of claim 15, wherein the at least one peripheral function includes at least one of sending a self-monitoring, analysis and reporting technology (SMART) request, recovery commands, firmware updates, diagnostic commands, and a reconfiguration command.

17. The method of claim 14, comprising receiving an access complete acknowledgment signal by the host adapter that is sent from the peripheral device.

18. The method of claim 17, wherein the host adapter is in communication with an array of peripheral devices, and wherein the host adapter sends the service port access request to another peripheral device of the array if the access complete acknowledgment signal is received.

19. The method of claim 13, comprising denying the host adapter access to the peripheral device.

20. The method of claim 19, comprising determining if a specific level of the priority of access indicated by the host adapter should be increased if access to the peripheral device has been denied.

* * * * *